United States Patent [19]

Okubo

[11] 3,997,180
[45] Dec. 14, 1976

[54] BABY CARRIAGE

[75] Inventor: Yoshikazu Okubo, Matsudo, Japan

[73] Assignee: Marble Industries Co., Ltd., Matsudo, Japan

[22] Filed: June 25, 1975

[21] Appl. No.: 590,258

[30] Foreign Application Priority Data

Sept. 19, 1974 Japan .......................... 49-112934

[52] U.S. Cl. .............................. 280/31; 280/47.41
[51] Int. Cl.² ........................................ B62B 7/14
[58] Field of Search ........ 280/47.38, 31, 30, 47.41; 5/108; 297/349

[56] References Cited

UNITED STATES PATENTS

| | | | |
|---|---|---|---|
| 2,568,988 | 9/1951 | Childs | 297/349 |
| 2,595,901 | 5/1952 | Sperring | 297/349 |
| 3,223,431 | 12/1965 | Gottfried et al. | 280/47.38 |
| 3,708,203 | 1/1973 | Barecki et al. | 297/349 X |
| 3,829,157 | 8/1974 | Lange, Jr. | 297/349 X |

Primary Examiner—Robert R. Song
Assistant Examiner—Michael J. Forman

[57] ABSTRACT

A baby carriage having a body on which a baby is to rest and which is detachably connected with a truck. Connecting means pivotally carries the carriage body, which however, can be fixed in any desired orientation by lock means. The carriage body includes ground bearing means which stabilizes it on a flat surface.

5 Claims, 3 Drawing Figures

BABY CARRIAGE

The invention relates to a baby carriage, and more particularly to a baby carriage having a carriage body on which a baby is to rest supported on a truck.

A number of baby carriages are known, which are broadly categorized, in the design of the carriage body, into cradle type and chair type. However, the carriage body is generally manufactured separately from the truck and secured to the latter subsequently, or both the truck and the carriage body is formed into an integral framework. Thus, with a conventional baby carriage, it is impossible to dismount the carriage body from the truck or to change its orientation, which resulted in the inconvenience that when carrying a baby who slept in the carriage indoors, the embracement of the baby in order to take him out of the carriage body awakes from the baby's sleep. This could be avoided if the carriage body is constructed to be detachable from the truck so as to permit the baby to be carried into the room while lying in the carriage body.

The carriage body is usually provided with a hood at a location thereabove in order to prevent the loss of sight of the baby. This could cause an exposure of the baby's face to laterally incident intense sunbeam or wind, depending on the direction followed by the carriage, which exposure could be overcome with a cradle carriage by changing the position of the baby within the carriage body but which cannot be avoided with a chair carriage.

Therefore, it is an object of the invention to provide a baby carriage having a carriage body which is detachably supported on a truck and which can be adjusted into any desired orientation in a single horizontal plane.

It is another object of the invention to provide a baby carriage having a carriage body which, when removed from the truck, can be stabilized on a flat surface.

It is a specific object of the invention to provide a separable baby carriage which is simple in construction and easy to use.

In accordance with the invention, there is provided a baby carriage comprising a truck including a plurality of wheels, a carriage body on which a baby is to rest, means for connecting the truck and the carriage body, and means for locking the connecting means, the connecting means detachably and pivotally supporting the carriage body.

With the baby carriage according to the invention, the baby resting on the carriage body can be protected from exposure to sunbeam or wind by adjusting the relative orientation of the truck and the carriage body.

The above and other objects, features and advantages of the invention will become apparent from the following detailed description of an embodiment thereof with reference to the drawings, in which.

Figure 1:
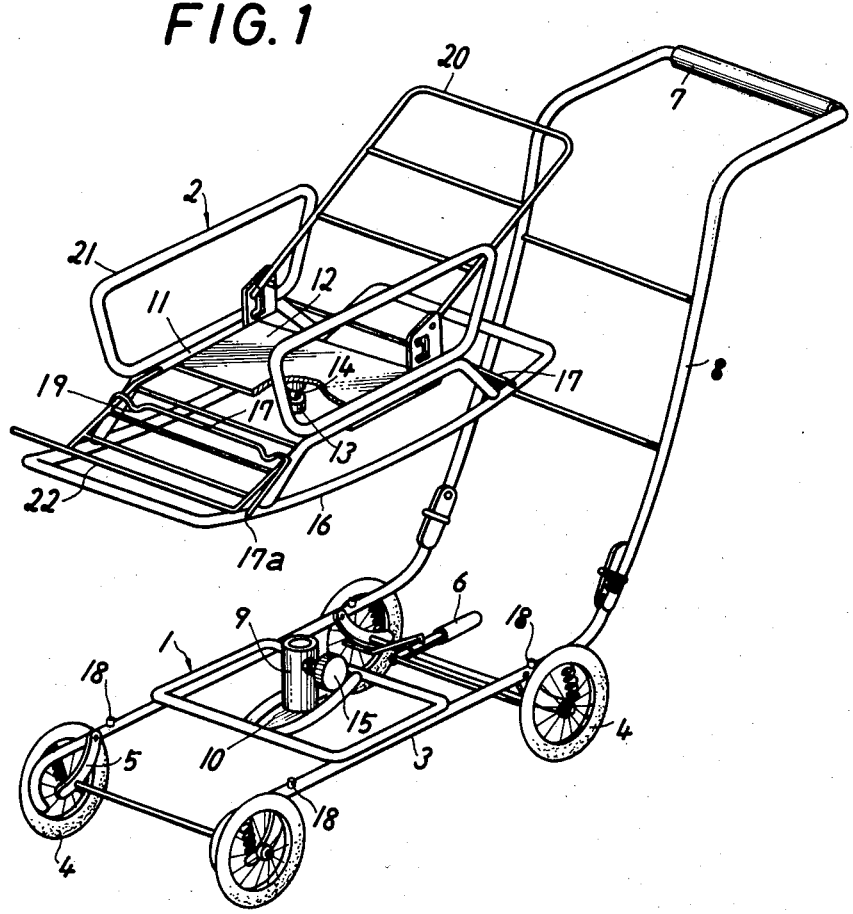
FIG. 1 is a perspective view of the baby carriage according to the invention, with the carriage body being dismounted from the truck.

Referring to the drawings, the baby carriage according to the invention comprises a truck 1 and a carriage body 2 which are detachably connected with each other. The truck 1 may be conventional, and is shown as comprising a framework 3 formed of aluminium pipe, for example. A plurality of wheels 4 are mounted on the framework 3 by means of springs 5, and there is provided brake means 6 which acts on the wheels 4. A grip 7 is formed on a handle frame 8 which is connected with the framework 3. In accordance with the invention, the truck 1 is provided with a fixture 9 which cooperates with a counterpart on the carriage body 2. The fixture 9 may be formed by a pipe having a hollow cylindrical cross section and has a vertical axis, extending upright from a baseplate 10 which is secured to the framework 3 nearly at its center.

Figure 3:
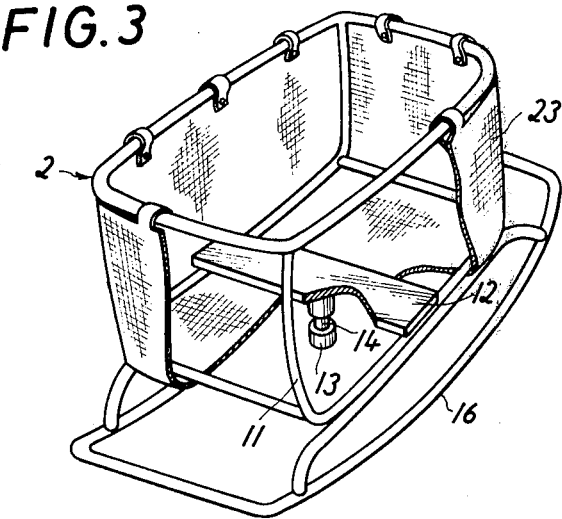
FIG. 3 is a perspective view of a modified carriage body.

The carriage body 2 is shown in FIG. 1 as a chair type, but may be a cradle type as shown in FIG. 3. In either design, it includes a framework 11 which may be similar to that used in the known carriage bodies. The framework 11 supports a bottom plate 12 which is provided with a fixture 13 forming a pair with the fixture 9 on the truck 1. In the example shown, the fixture 13 comprises a stud depending downwardly from the bottom plate and formed with an annular groove 14. The pair of fixtures 9 and 13 can be engaged with each other in the manner of a conventional shaft and bearing, thus mounting the carriage body on the truck 1 and permitting the carriage body 2 to be oriented in a desired direction relative to the truck 1. The fixture 9 is provided with a lock nut 15 which extend through the cylindrical wall of the fixture 9 to engage the annular groove 14 in the fixture 13, thus fixing the carriage body 2 in a fixed orientation relative to the truck 1 and preventing a disengagement of the carriage body 2 thereform.

Figure 2:
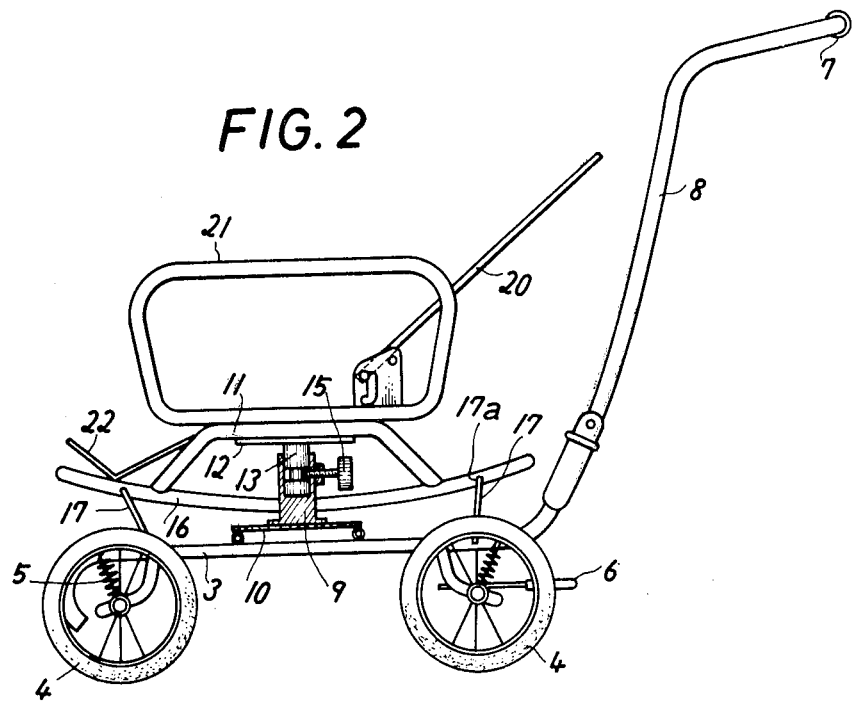
FIG. 2 is a side elevation of the baby carriage with an encircled portion being shown in section and to an enlarged scale.

In accordance with the invention, the framework 11 of the carriage body 2 includes a ground bearing frame 16 which is distributed below the fixture 13 for permitting a stabilized placement of the carriage body 2 on a flat surface when it is removed from the truck 1. In the example shown, the ground bearing frame 16 is curved in configuration so as to permit the carriage body 2 to be used as a rocking chair or cradle. A pair of auxiliary supports 17 are pivotally mounted on the ground bearing frame 16, and function as a buffering member between the frameworks 11 and 3 when the carriage body 2 is mounted in a normal orientation on the truck 1 (FIG. 2), but can be turned upside as shown in FIG. 1 when dismounting the carriage body 2 from the truck 1 or changing its orientation. Specifically, each auxiliary support 17 is substantially U-shaped having a pair of limbs 17a, the end of which is pivotally connected with the framework 11. When the carriage body 2 is mounted on the truck 1, the auxiliary support 17 rest on the framework 3 of the truck 1 and assume a given position by abutting against pairs of stops 18. At this end, it is convenient to form indentations 19 (FIG. 1) in the auxiliary support 17 for engagement with the framework 3. A normal load applied by the carriage body 2 will be accommodated by the operative connection between the pair of fixtures 9, 13, and if the load is biased either forwardly or rearwardly of the carriage body 2, it will be also accommodated by either auxiliary support 17, thus preventing the fixtures 9, 13 from excessive stresses. When the carriage body 2 is removed from the truck 1 and placed on a flat surface, the auxiliary supports 17 can be turned down to bear against the surface, thereby stabilizing the position of the carriage body 2.

With a chair type baby carriage, the carriage body 2 includes a back rest 20 which is constructed to be adjustable in its angle of inclination, and a pair of arm rests 21, all of which are usually covered with a sheet of a cloth or resin material together with bottom plate 12. In the example shown, the carriage body 2 also includes a foot rest 22. As shown in FIG. 3, the carriage body 2 of a cradle type is provided with a covering 23 which extends across the entire framework 11. While not shown, the carriage body of either design may be provided with a known hood.

While a particular embodiment of the invention has been described, it is intended that the above description is exemplary only and is not limiting the scope of the invention. It will be appreciated that certain changes and modifications can be made therein without departing from the spirit of the invention. By way of example, the fixtures 9, 13 may be interchanged in position, or may be replaced by alternate constructions, provided they afford a detachable connection between the carriage body and the truck. However, the fixtures shown are advantageous in its load bearing capability.

Having described the invention, what is claimed is:

1. A baby carriage comprising a truck having a plurality of wheels thereon, connecting means extending upwardly from said truck, a carriage body having connecting means projecting downwardly therefrom cooperable with said connecting means on said truck for detachably and pivotably mounting said carriage body on said truck, said connecting means cooperating to define a vertical pivot axis means for locking said carriage body on said truck in a selected pivotal position relative thereto, and a ground-bearing frame integral with said carriage body and extending below the connecting means thereon for supporting the carriage body upon a flat surface in a stable manner when said carriage body is detached from said truck.

2. A baby carriage according to claim 1 in which the ground bearing means has a curved surface for permitting a rocking motion of the carriage body.

3. A baby carriage according to claim 1, further including auxiliary support means pivotally mounted on the carriage body, and stop means on the truck, the auxiliary support means engaging the stop means when the carriage body is connected with the truck in a given orientation, thereby cooperating with the connecting means to resiliently accommodate a load applied by the carriage body.

4. A baby carriage according to claim 1 in which the carriage body is of a chair type.

5. A baby carriage according to claim 1 in which the carriage body is of a cradle type.

* * * * *